United States Patent Office 3,210,167
Patented Oct. 5, 1965

---

3,210,167
METALLIC APPLIANCES AND COMPONENTS SUBJECTED TO CONTACT WITH MOLTEN MATERIALS AT HIGH TEMPERATURE
Roger Lacroix, Suresnes, and Henri Blavat, Cachan, France, assignors to Comptoir Lyon-Alemand Louyot & Cie, Paris, France
No Drawing. Filed Apr. 4, 1963, Ser. No. 277,409
Claims priority, application France, Apr. 19, 1962, 895,121
5 Claims. (Cl. 29—199)

The present invention relates to an improvement in metallic appliances and components which are subjected to contact with molten materials at high temperature, especially glasses, salts or oxides.

The invention is more especially concerned, among said metallic appliances and components, with those having a base of platinum, of platinum group metals, and of the alloys which are formed either between these latter or with base metals. Materials of this type have many advantages over ceramic materials, and offer much better resistance both to dissolving, to disintegration and to erosion at high temperature. It accordingly follows as a result that said materials modify to a much lesser extent the properties of the materials treated, such as their purity, refraction index, color, homogeneity, proportions of gas pockets, etc. Such materials are therefore widely employed and among the applications of these latter can be mentioned crucibles for the formation of single crystals of salts which are endowed with special optical or electrical properties, crucibles for melting optical glasses, systems for the manufacture of glass fiber, piping, refining chambers, drain pipes, baffles, protection plates, etc., which are employed in the manufacture of glass or glass objects. However, in spite of their superiority over the refractory ceramics, platinum and alloys of platinum group metals eventually deteriorate. And although they are recoverable, these materials are costly and the replacement of an element in a furnace for making glass is also a costly operation as a result of the hindrance caused to the manufacturing process.

The main purpose of the present invention is therefore to endow the above-mentioned materials with properties such that the various requirements met with in practice can accordingly be complied with more effectively than has hitherto been possible, said materials being especially characterized in that they make it possible to lengthen the life of metallic components or appliances, and prevent any modification of glass by the metal, especially in the case of lead glass, the effect of such modification being to give a tint to said glass which would permanently impair the optical qualities thereof.

Insofar as concerns first of all the length of life of metallic appliances which are in contact at high temperature with molten materials, it has been acknowledged that there are three principal actions which play a contributory role in limiting said length of life:

(1) A physical action, namely, creep. At high temperature, and under the prolonged action of even small forces such as the weight proper of the metallic appliance and that of its contents, there takes place a progressive deformation which is finally followed by the appearance of cracks. The appliance or component then ceases to be fluid-tight and must either be replaced or repaired.

(2) A chemical action is exerted by the molten material.

A glass which contains oxygenated combinations of metals—oxides, silicates, aluminates, silicoaluminates, borates, silicoborates, etc.—which can be represented by the symbol MeO. Me can be an element such as Al, Si, Mg, Ca, Pb . . . , while O indicates the oxygenated radical which can also be reduced to oxygen alone. The MeO compounds are dissociated to a greater or lesser extent according to a thermodynamic euilibrium of the type:

MeO (glass) ⇌ Me (Pt) + O (glass)

This means that, at the metal/glass boundary, the compound MeO which is present in solution in the glass is partly dissociated into an element Me which is dissolved in the platinum or in the alloy of platinum group metals and partly into a compound O which remains in the glass. The above equilibrium is governed by the law of mass action:

$$K = \frac{A_{Me\ (Pt)} \times A_{o\ (glass)}}{A_{MeO\ (glass)}}$$

$A_{Me\ (Pt)}$ denotes the activity of Me in the platinum or platinum-group alloy,
$A_{o\ (glass)}$ denotes the activity of O in the glass,
$A_{MeO\ (glass)}$ denotes the activity of MeO in the glass,
K is a constant at a given temperature.

As a rule, the constant K is very small, that is to say, the compounds MeO are but very slightly dissociated.

When the molten glass comes into contact with the platinum or platinum-group alloy, there consequently appears as a result of dissociation a very small quantity of element Me which dissolves at the surface of the metal. The dissociation process stops as soon as the activity $A_{Me\ (Pt)}$ of the element at the surface of the appliance or component which is in contact with the molten glass reaches the equilibrium value. A further quantity of element Me can only be formed when the quantity which had previously formed has diffused through the metal. The diffusion takes place at a slow rate and imposes that rate on the entire process.

The solution of the element Me in platinum or a platinum-group alloy is sometimes very different from an ideal solution within the thermodynamic meaning of the term on account of the existence of strong interatomic bonds. There can be formed new fusible or brittle phases which travel progressively, frequently between the grain boundaries of the metal, and finally result in the separation of said boundaries. This progressive motion can be substantially accelerated by physical stresses. The lead oxide compounds which constitute a substantial proportion of certain glasses, and the oxide compounds of arsenic and antimony which are only added in small quantities, are at the same time the most dissociable and the most miscible with certain platinoids.

(3) A chemical action exerted by the atmosphere.
At high temperature, the oxygen which is present in air forms gaseous oxides when combined with the platinoids. The thickness of the appliance or component is therefore progressively reduced, especially when the atmosphere is rapidly renewed. The attacking action is more marked at the grain boundaries, which so acts together with the other processes described as to result in the perforation of the metal as a result of the formation of intergranular cracks.

In short, in order to extend the life of appliances or components of platinum or platinum-group alloys which are employed at high temperature in contact with molten materials, and in order to avoid impairment of the optical qualities of said materials, it is necessary to improve the resistance of the metal to four principal actions:

I. Creep,
II. Corrosive action of the elements which constitute the molten material,
III. Corrosive action of the oxygen which is present in air,
IV. Discoloration of the molten glass.

In point of fact, it is known that the different platinum group metals or alloys cannot be classified in the same order of resistance to these different actions.

In the case of creep, the alloys which offer the highest resistance are the alloys of platinum which contain at least 10% rhodium or iridium. Rhodium, iridium, ruthenium, osmium whether in the pure state or alloyed with each other have greater mechanical strength but the fabrication of these metals is more difficult than that of the platinum alloys.

In the case of corrosion by lead, antimony or arsenic, the most effective qualities of resistance are found in osmium, ruthenium and iridium.

In the case of corrosion by oxygen present in air, the metal which has the best behavior is rhodium, followed by platinum.

Finally, platinum produces the least discoloration of glass.

The invention mainly consists, at the same time as providing a composite metallic material having a base of platinum and platinum alloys and/or alloys of platinum-group metals with at least two layers having different compositions which are joined together by known methods of plating, in making provision for at least one inner layer of pure platinum which is in contact with the molten material and one outer layer of platinum-rhodium alloy which has a thickness of at least one tenth of a millimeter.

Apart from this principal arrangement, the invention further consists in certain other arrangements which are employed preferably at the same time, viz:

The composite metallic material comprises, in addition to the inner layer of pure platinum and the outer layer of platinum-rhodium alloy, a third central layer formed of an alloy which offers resistance to penetration by agents derived from the molten materials which corrode platinum, and/or an alloy having high mechanical strength at high temperature.

The said central layer is an alloy of platinum with at least one of the following elements: iridium, ruthenium, rhodium, osmium.

The present invention will in any case be more readily understood from the examples which follow below and which, as will be understood, are given solely by way of indication and not in any sense by way of limitation.

*Example 1*

Crucible for the fusion of optical glasses.

The crucible is provided with a double plating which is formed of an inner layer of pure platinum and an outer layer of platinum-rhodium alloy containing 10% by weight of rhodium.

*Example 2*

Crucible for the fusion of optical glasses which differs from the previous example in the composition of the outer layer which is a platinum-rhodium alloy containing 20% rhodium.

*Example 3*

Material intended to be employed at high temperature in the presence of molten glass.

The inner layer which is in contact with the molten glass is of pure platinum. The central layer is formed of an iridioplatinum alloy having a 15% iridium content. The said central layer provides a creep strength and constitutes an obstacle to the penetration of lead, antimony or arsenic.

The outer layer is a platinum-rhodium alloy containing 20% rhodium which contributes to creep strength and which ensures resistance to oxygen which is present in air.

*Example 4*

Crucible for the fusion of optical glasses.

The inner layer which is in contact with the glass is formed of pure platinum.

The central layer is formed of a platinum-ruthenium alloy which has a content of 13% ruthenium with a view to ensuring resistance to corrosive attack by lead.

The outer layer which is in contact with the outer air is formed of platinum containing 20% rhodium. In conjunction with the platinum-ruthenium alloy, said outer layer ensures creep resistance.

*Example 5*

Crucible for the fusion of optical glasses.

The inner layer which is in contact with the glass is of pure platinum.

The central layer is of platinum containing 20% iridium.

The outer layer which is in contact with the outer air is of platinum containing 30% rhodium.

The central layer stops any possible penetration of lead, arsenic or antimony.

The outer layer ensures resistance to aerial oxygen and also creep resistance in conjunction with the central layer.

*Example 6*

Glass-furnace baffle.

This component, which is completely immersed in the glass comprises a central core of platinum-ruthenium alloy containing 13% ruthenium and clad on both faces with pure platinum.

The foregoing examples are not limitative. It is possible to make use of all the alloys of platinum and rhodium, the resistance of platinum-rhodium alloy both to creep and to the action of lead being greater as the rhodium content is correspondingly higher. On the other hand, the difficulties involved in fabrication also increase with the proportion of rhodium.

As will be understood, and as has in any case become apparent from the foregoing, the invention is not limited in any respect to the modes of application or to the examples of embodiment which have been described above but is intended, on the contrary, to comprise within its scope all alternative forms.

What we claim is:

1. An improved composite article, which is subject to contact with molten materials at high temperature, comprising a first inner layer for contacting said material, comprising platinum, a second central layer of an alloy of platinum and a metal selected from the group consisting of iridium, ruthenium and osmium and an outer layer of a platinum-rhodium alloy.

2. An article according to claim 1 in which the outer layer of platinum-rhodium alloy has a thickness of at least 0.10 millimeter.

3. An article according to claim 1 in which the alloy of the outer layer contains from 10–30% rhodium.

4. An article according to claim 1 in which the central layer contains an alloy of platinum and from 10–20% iridium.

5. An article according to claim 1 in which the central layer is an alloy of platinum and about 13% ruthenium.

References Cited by the Examiner

UNITED STATES PATENTS

| | | | |
|---|---|---|---|
| 2,106,527 | 1/38 | Hostetter | 29—194 |
| 2,973,283 | 2/61 | Hill | 29—199 |
| 3,044,155 | 7/62 | Robinson | 29—199 |
| 3,065,526 | 11/62 | Hill | 29—199 |

DAVID L. RECK, *Primary Examiner.*

HYLAND BIZOT, *Examiner.*